Feb. 16, 1965   R. GREMILLION   3,169,568
COTTON PICKER BAR RESIZING TOOL ASSEMBLY
Filed Oct. 5, 1962   4 Sheets-Sheet 1

INVENTOR.
ROLAND GREMILLION
BY
*Rupert J. Brady*
ATTORNEY

Feb. 16, 1965   R. GREMILLION   3,169,568
COTTON PICKER BAR RESIZING TOOL ASSEMBLY
Filed Oct. 5, 1962   4 Sheets-Sheet 2

INVENTOR.
ROLAND GREMILLION
BY
*Rupert J. Brady*
ATTORNEY

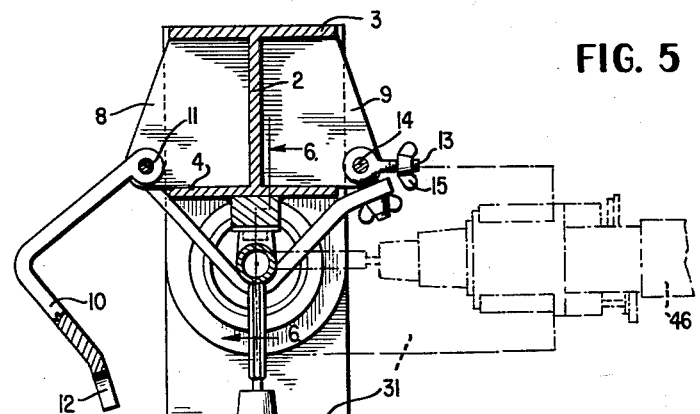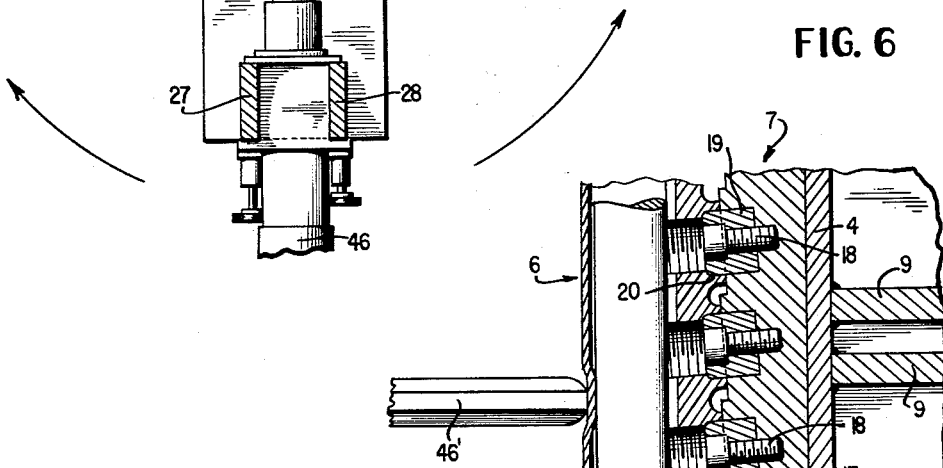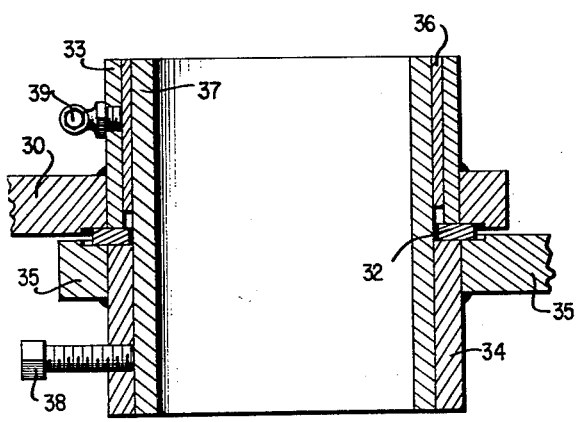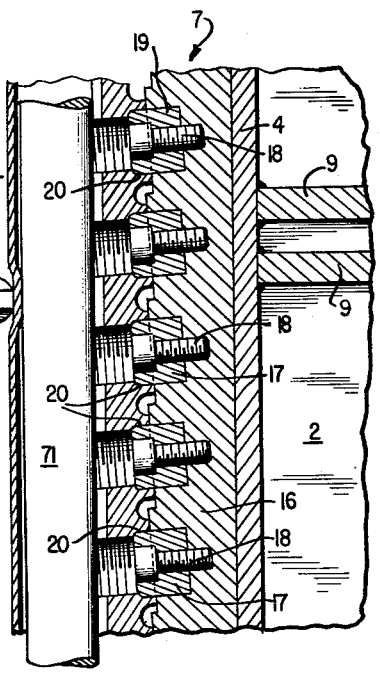

Feb. 16, 1965 R. GREMILLION 3,169,568
COTTON PICKER BAR RESIZING TOOL ASSEMBLY
Filed Oct. 5, 1962 4 Sheets-Sheet 4

INVENTOR.
ROLAND GREMILLION
BY
*Rupert J. Brady*
ATTORNEY

United States Patent Office 3,169,568
Patented Feb. 16, 1965

3,169,568
COTTON PICKER BAR RESIZING TOOL
ASSEMBLY
Roland Gremillion, Cottonport, La., assignor to Gremillion Brothers, Inc., Cottonport, La., a corporation of Louisiana
Filed Oct. 5, 1962, Ser. No. 228,653
8 Claims. (Cl. 153—32)

This invention relates to a tool assembly for resizing cotton picker bars, and more particularly to a tool assembly for recrimping the lands in a spindle carrier bar to thereby renew the seats for bushings positioned within said bar. The resizing tool assembly of the present invention comprises essentially an anvil adapted to support a spindle carrier bar releasably mounted thereon, a swing table rotatably secured to support means for the anvil, said table having a crimping tool adjustably mounted thereon, whereby when a spindle carrier bar, having a sized shaft or mandrel mounted therein, is secured to the anvil the table and associated crimping tool may be swung through an arc of 180° to crimp the spindle carrier bar, thereby renewing the seats for bushings used to support and position a spindle drive shaft and spindle driving gears within said spindle carrier bar.

There have been many improvements made in cotton pickers in recent years. However, in spite of the many improvements made, the picking mechanism of the cotton pickers still require maintenance which is expensive, not only in the out-of-pocket expenses for the cost of the actual maintenance of the picking mechanism but also in the loss of production while the picking mechanism is being repaired.

In cotton picking mechanisms of the type shown in U.S. Patent 2,440,767, to D. B. Baker dated May 4, 1948, having a spindle carrier bar, a drive shaft carrying spindle driving gears and bushings supporting the drive shaft and associated spindle driving gears within the spindle carrier bar, normal wear on the bushings due to the rotation of the drive shaft and inward pressure from the spindles, causes the worn bushings to begin rotating with the shaft to thereby wear the lands formed in the picker bar for supporting the bushings.

In order to resize the lands for supporting the bushings within the spindle carrier bar, it has been proposed to use a blunt cold chisel and heavy hammer and strike the bar bushing lands at three places to form indentations on each bushing land. This method of resizing a spindle carrier bar is not satisfactory because it is not only time-consuming but it is also inaccurate and the indentation formed in the bar results in extensive damage to the bushings.

The above disadvantages of resizing a cotton picker bar are overcome by the improved resizing tool assembly of the present invention whereby the bushing lands on the spindle carrier bar may be economically and expeditiously resized by forming a continuous crimp on the carrier bar to thereby achieve factory duplication.

An object of this invention is to provide an improved tool assembly for resizing cotton picker bars.

Another object of the invention is to provide a tool assembly for recrimping the lands in a spindle carrier bar to thereby renew the seats for bushings positioned within the bar.

Yet another object of the invention is to provide an improved tool assembly for resizing cotton picker bars wherein an anvil is provided, adapted to selectively support either a fourteen or twenty spindle picker bar.

Still another object of the invention is to provide an improved tool assembly for resizing cotton picker bars including an anvil for supporting a spindle carrier bar to be resized and a swing table carrying a crimping tool whereby the table and associated crimping tool may be swung through an arc of 180° while crimping the spindle carrier bar.

A further object of the invention is to provide an improved tool assembly for resizing cotton picker bars including an anvil for supporting a spindle carrier bar to be resized and a swing table having a crimping tool adjustably mounted thereon whereby a fourteen or twenty spindle picker bar may be recrimped.

With these and other objects in view, which may be incident to my improvements, the invention consists in the parts and combinations to be hereinafter set forth and claimed, with the understanding that the several necessary elements comprising my invention, may be varied in construction, proportions and arrangements, without departing from the spirit and scope of the appended claims.

In order to make my invention more clearly understood, I have shown in the accompanying drawings means for carrying the same into practical effect, without limiting the improvements in their useful application to the particular constructions which, for the purpose of explanation, have been made the subject of illustration.

In the drawings:

FIGURE 5 is a sectional view taken along line 5—5 of FIGURE 1 showing, in phantom, the crimping tool moved through an arc of 90°;

FIGURE 6 is a fragmentary view taken along line 6—6 of FIGURE 5 showing a spindle carrier bar being crimped and having a mandrel or sizing rod positioned therein;

FIGURE 7 is a sectional view taken along line 7—7 of FIGURE 2 showing the pivotal connection between the swing table and the anvil support;

Figure 1:
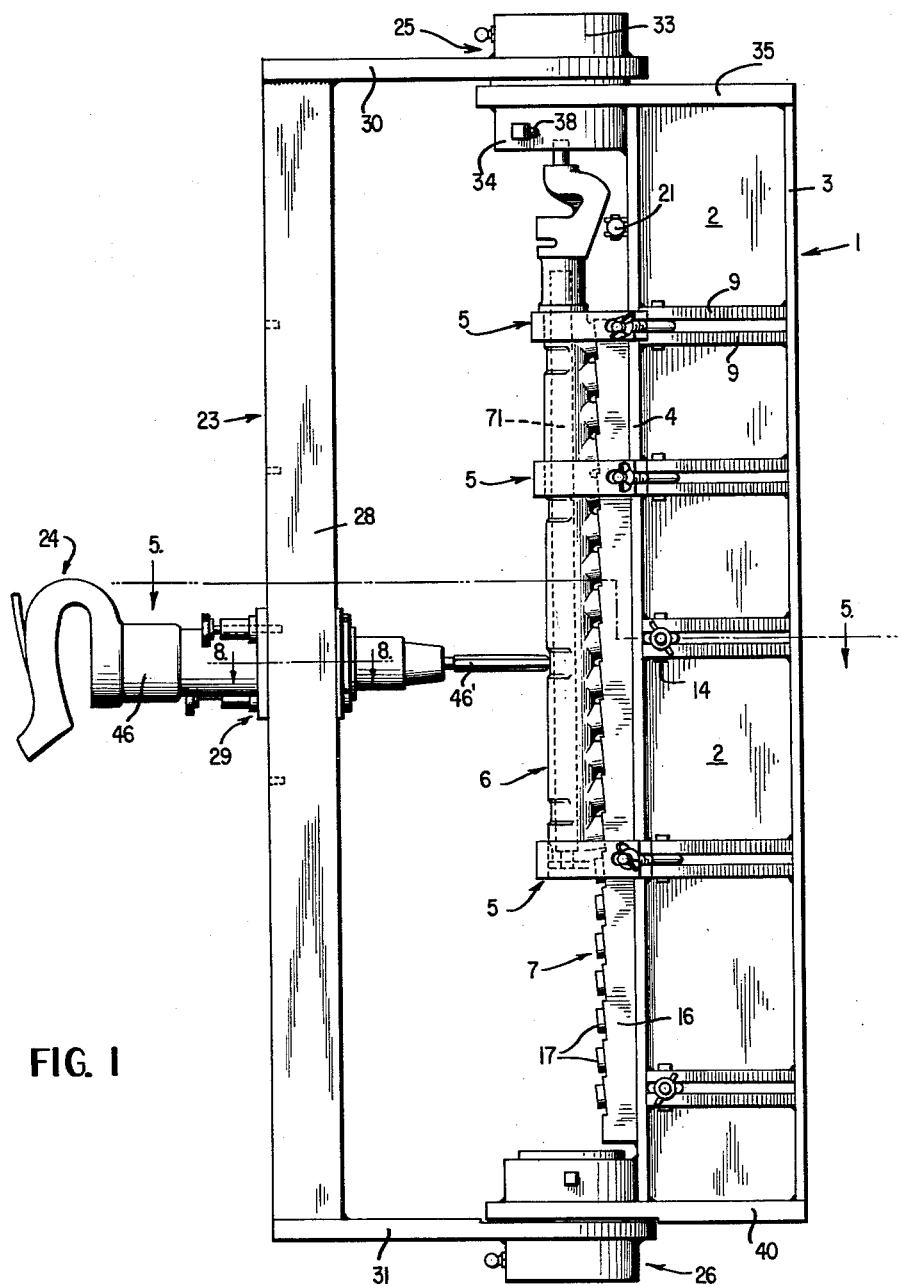
FIGURE 1 is a side elevational view of the improved cotton picker bar resizing tool assembly showing a fourteen spindle picker bar mounted on the anvil and a crimping tool mounted on the swing table.

Referring to the drawings, and more particularly to FIGURES 1 to 3 and 5, the cotton picker bar resizing tool assembly comprises an I-beam designated generally by the reference numeral 1 having a web portion 2 integrally connected to flanges 3 and 4. A plurality of dogs 5 carried by the I-beam are provided for securing a spindle carrier bar 6 to an anvil 7, to be described more fully hereinafter.

Each dog comprises a pair of plates 8 and 9 extending outwardly from each side of the I-beam web 2. A suitably shaped clamping bar 10 is pivotally secured to the plates 8 by pins 11, said clamping bar having a bifurcated end 12 adapted to engage a threaded stem 13 pivotally connected to the plate 9 by pins 14, said threaded stems having wing nuts 15 for securing the bifurcated end of the clamping bar to the threaded stem when securing a spindle carrier bar to the anvil.

The I-beam flange 3 is adapted to be secured to a suitable support structure (not shown) to support the entire tool assembly. Although the tool assembly is shown in a vertical position it is to be understood that the assembly could also be mounted in a horizontal position with the flange 3 secured to the support structure.

As will be seen in FIGURE 6, the anvil 7, which is fixedly secured to the I-beam flange 4 by welding or by other suitable securing means, comprises a plate 16 having a column of plugs 17, each plug being threaded to the plate as at 18. The plugs 17 are mounted on the plate 16 at approximately a 4° angle to the horizontal, said plugs being machined to conform with the carrier bar spindle aperture 19 and spindle nut shoulder 20. By this construction and arrangement the plugs 17 snugly fit within the spindle apertures 19 in the bar 6 to thereby support the spindle carrier bar on the anvil 7 and to maintain the bar stationary while being crimped.

The I-beam flange 4 is also provided with a rod 21 (FIGURE 2) pivotally secured thereto as at 22, said rod serving as a lever to facilitate removal of the spindle carrier bar 6 from the anvil 7 at the completion of the resizing operation.

Figure 2:
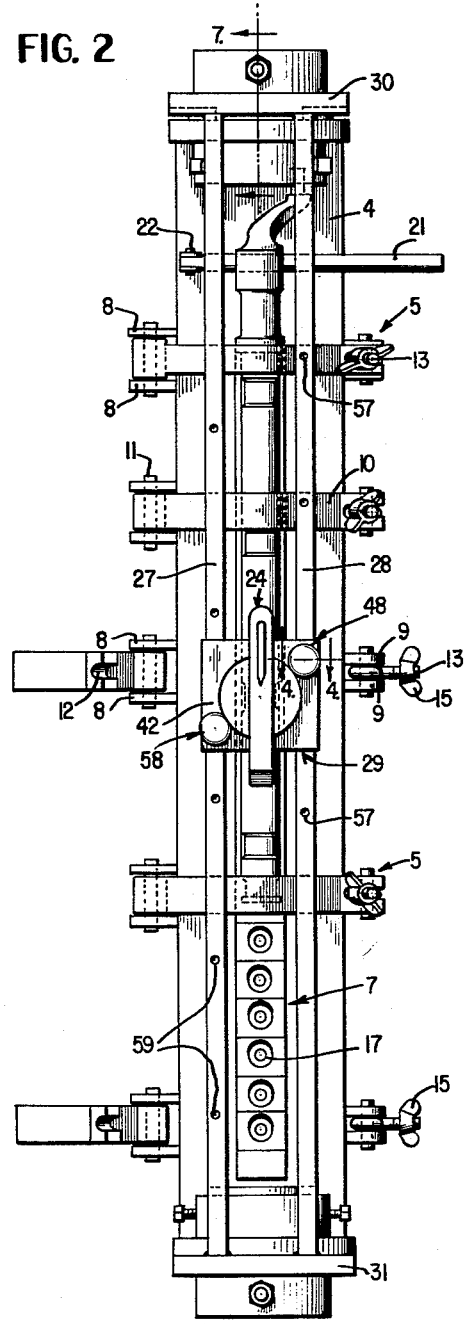
FIGURE 2 is a front elevational view of the resizing tool assembly shown in FIGURE 1.
Figure 3:
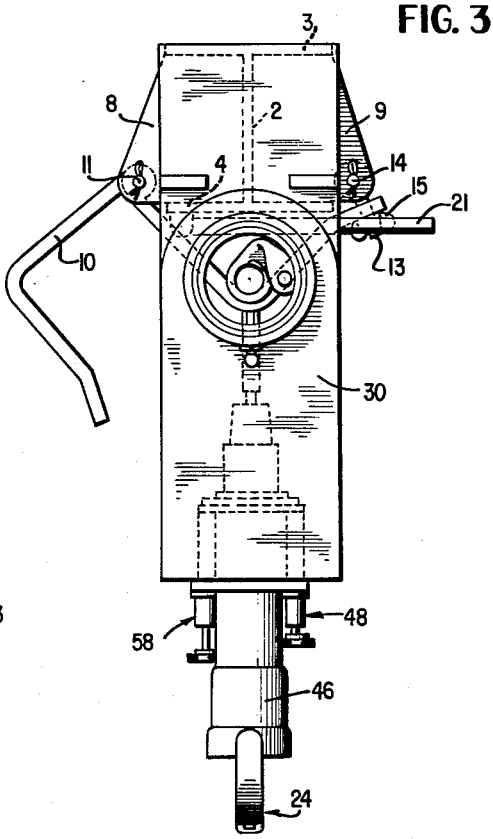
FIGURE 3 is a top plan view of the resizing tool assembly.
Figure 4:
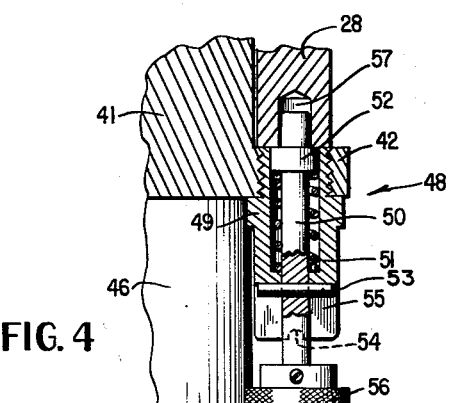
FIGURE 4 is a sectional view taken along line 4—4 of FIGURE 2 showing the detent means for the crimping tool carriage.
Figure 8:
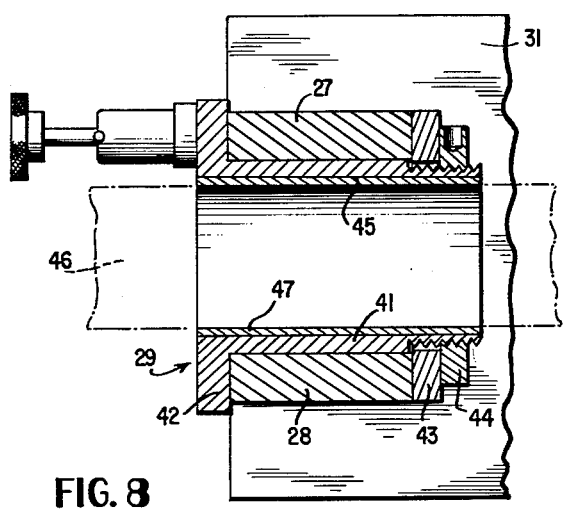
FIGURE 8 is a sectional view taken along line 8—8 of FIGURE 1 showing the crimping tool carriage.

As will be seen in FIGURES 1 and 2, a swing table 23 carrying a crimping tool 24 is connected to each end of the I-beam 1 through bearings 25 and 26. The swing table 23 comprises a pair of parallel guide rails 27 and 28 forming a guideway for slidably receiving therebetween a carriage 29 for the crimping tool 24, the ends of the plate means having arms 30, 31 rigidly secured thereto for connecting the swing table to the I-beam 1 through the bearings 25 and 26, respectively.

Reference being had to FIGURE 7, the bearing 25 comprises a brass washer 32 seated between a collar 33 secured to one end of the arm 30 and a collar 34 rigidly secured to an arm 35 rigidly secured to one end of the I-beam 1. A brass bushing 36 is positioned between the inner surface of the collar 33 and the outer surface of a sleeve 37 secured to the collar 34 by a plurality of circumferentially arranged set screws 38. Suitable grease fittings 39 are provided in the collar 33 for supplying lubricant to the brass washer 32 and sleeve 37. Although the washer 32 and sleeve 37 have been described as being formed from brass, it is to be understood that other types of anti-friction material can be employed to facilitate the oscillation of the swing table 23 with respect to the I-beam 1.

Bearing 26 connects swing table arm 31 to an arm 40 (FIGURE 1) rigidly secured to the opposite end of the I-beam and since bearing 26 is of the same construction as bearing 25 its details need not be described.

Referring to FIGURES 1, 2, 4 and 8, the carriage 29 for the crimping tool 24 comprises a slide block 41 mounted between the guide rails 27 and 28, one end of said slide block having an integral guide plate 42 slidably mounted on the edges of the rails 27 and 28. The opposite end of the slide block has a guide plate 43 secured thereto by a retaining ring 44, said guide plate abutting the opposite edges of the guide rails 27 and 28. The slide block 41 is provided with a cylindrical opening 45 adapted to receive an air hammer 46 having a punch 46′, said opening having a bushing 47 mounted therein to facilitate the insertion and removal of the air hammer with respect to the slide block 41.

In order to maintain the carriage 29 and associated crimping tool 24 in a selected position, during the crimping operation, detent means 48 is provided. The detent means comprises a cylindrical housing 49 threadably secured to one corner of the guide plate 42, said housing having a rod 50 slidably mounted therein and biased inwardly of said housing by spring means 51 positioned between one end of the housing and a collar 52 secured to the rod. The rod 50 is provided with a pin 53 adapted to seat in a notched portion 54 formed in a pair of parallel plate members 55 secured to the housing 49. One end of the rod is provided with a knurled knob 56 for actuating the rod 50, whereby when the rod is pulled outwardly from the housing 50 and turned a quarter of a turn the pin 53 engages the notched portions to maintain the pin in its outward position. The opposite end of the rod 50 is adapted to engage a recess 57 formed in the edge surface of the guide rail 28; thus when the spring 51 biases the rod inwardly of the housing the protruding end of the rod engages the recess to maintain the carriage 29 in its selected position. As will be seen in FIGURE 2, the edge surface of the guide rail 28 is provided with a plurality of recesses 57 for cooperation with the spring biased rod 50 in maintaining the carriage in a selected position. A second detent means 58 is mounted on the corner of the guide plate 42 diagonally opposite from the detent means 48 and adapted to cooperate with a plurality of recesses 59 formed in the edge surface of guide rail 27. The recesses 57 and 59 are alternately spaced along the guide rails in such a manner that either the detent 48 or 58 will hold the carriage 29 in a selected position. By this construction and arrangement either a fourteen or twenty spindle picker bar can be crimped, to be described hereinafter.

Figure 9:
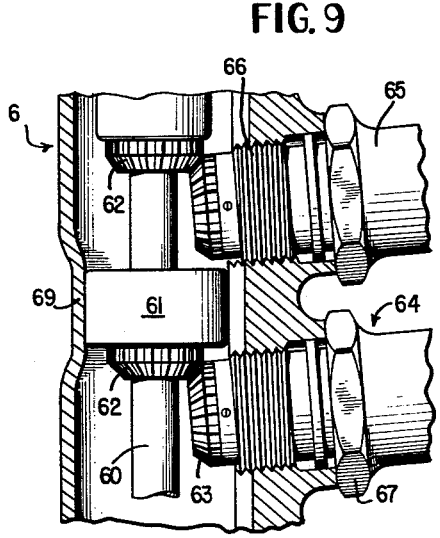
FIGURE 9 is a detail view of a resized spindle carrier bar showing the bushings seated on the lands for supporting the drive shaft and spindle drive gears.
Figure 11:
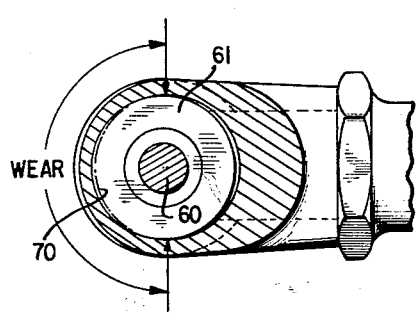
FIGURE 11 is a sectional view taken along line 11—11 in FIGURE 10.
Figure 10:
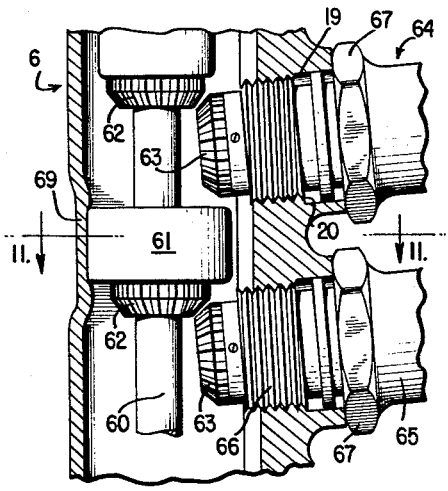
FIGURE 10 is a detail view similar to FIGURE 9 showing the bushings mounted in a spindle carrier bar.
Figure 12:
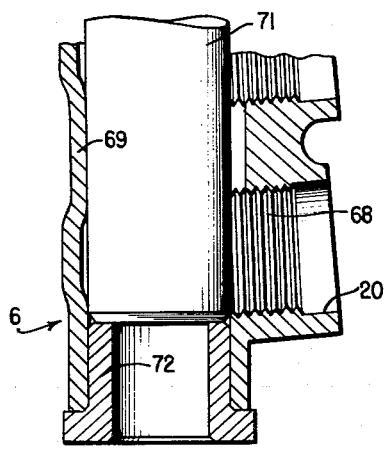
FIGURE 12 is a fragmentary sectional view of the end of a spindle carrier bar having a sizing rod positioned therein.

The type of cotton picker bar for which the improved tool assembly is particularly adapted for resizing, is illustrated in FIGURES 9 and 10, wherein the spindle-carrier bar 6 encloses a drive shaft 60 supported on bushings 61. Although only one bushing is shown it will be understood that there will be four such bushings in a fourteen-spindle picker bar and five bushings in a twenty-spindle picker bar. The hubs of spindle-driving gears 62 are journalled within the bushing 61 and secured to the drive shaft 60 for rotation therewith, said spindle-driving gears being adapted to mesh with bevel gears 63 secured to an associated spindle assembly 64. Each of the spindle assemblies includes a hollow spindle holder member 65 having an exterior threaded portion 66 at its inner end and a faceted portion 67 for engagement by a wrench to facilitate screwing the threaded portion 66 into the threaded portion 68 of the aperture 20 formed in the spindle-carrier bar 6. As will be seen in FIGURES 9, 10 and 12, a plurality of lands 69 are formed in the spindle-carrier bar 6 to provide seats for the bushings 61 to thereby maintain a press-fit between the bushings 61 and the spindle-carrier bar 6. After extended use of the cotton picker bar, the portion of the bushing in which the drive shaft 60 is journaled becomes worn, due to rotation of the shaft and inward pressure from spindle bevel gears 63. Since there is only a press-fit between the bushings 61 and the spindle-carrier bar 6 the worn bushings begin to rotate with the shaft to thereby wear and gouge the lands 69, whereby the gears 62 and 63 move out of engagement to thus prevent rotation of the spindles. FIGURES 10 and 11 illustrate spindle-carrier bars having worn lands caused by the rotation of the bushing 61 relative to the spindle-carrier bar 6; the dotted line portion 70 (FIGURE 11) representing the worn portion of the land and FIGURE 9 illustrates a resized spindle-carrier bar wherein the bar has been crimped according to the present invention to properly position the bushing therein.

After a fourteen or twenty-spindle cotton picker bar has been used to such an extent that the lands are worn, as shown in FIGURE 10, the shaft 60, bushings 61, gears 62, 63 and spindles are removed from the spindle-carrier bar 6. A mandrel or sizing bar 71 (FIGURE 12) is inserted within the spindle-carrier bar 6, the end of the rod engaging the end of a sleeve 72 formed in one end of the bar. The spindle-carrier bar and associated sizing rod are then mounted on the anvil 7 and secured thereto by the dogs 5, as described hereinabove. After the crimping tool 24 is adjusted on the guide rails 27 and 28, the air hammer 46 is actuated to thereby drive the punch 46′. At the beginning of the crimping operation, the crimping tool 24 is in the position shown in FIGURE 2; the air hammer is then actuated and the swing table is rotated 90° in one direction whereby a portion of the spindle-carrier bar 6 is crimped. The crimping operation is then stopped and the swing table is brought back to the mid-position as shown in FIGURE 2 and the crimping operation is then begun, moving the swing table 23 and associated crimping tool 24, 90° in the opposite direction (FIGURE 5). After one land has been crimped as shown in FIGURE 6, the crimping tool carriage 29 is then moved on the guide rails 27, 28 and retained in the desired position by detents 48 or 58 and the crimping operation is begun again. After all the lands have been crimped the dogs 5 are opened and the rod 21 (FIGURE 2) is pulled away from the I-beam flange 4 to facilitate removal of the spindle-carrier bar 6 from the anvil.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A resizing tool assembly of the character described for recrimping the lands in a spindle carrier bar comprising: support means, a plate mounted on said support means, a plurality of plugs mounted on said plate and adapted to fit within the apertures of a spindle carrier bar to support the bar while being crimped, clamping means operatively connected to said support means adjacent said plurality of plugs and adapted to secure a spindle carrier bar to said plate and said plurality of plugs, a swing table operatively connected to the support means for movement relative to said plate, and a crimping tool assembly adjustably mounted on the swing table adapted for crimping the lands in a spindle carrier bar secured to said plate and plurality of plugs.

2. A resizing tool assembly according to claim 1, and a rod pivotally connected to said support means laterally of said plurality of plugs and transversely movable to facilitate removal of the spindle carrier bar from the plurality of plugs at the completion of the resizing operation.

3. A resizing tool assembly as set forth in claim 1 wherein said swing table comprises a pair of parallel guide rails, arm means connecting the respective ends of the guide rails to the support means, a carriage slidably mounted on the guide rails and having said crimping tool assembly connected thereto, and detent means operatively connected between said carriage and said guide rails for maintaining the carriage and crimping tool in a selected position on the guide rails.

4. A tool assembly for recrimping worn lands on a cotton picker bar comprising, support means, a plurality of plugs connected to said support means and adapted to engage the plurality of spindle apertures of a cotton picker bar substantially throughout its length to support the bar for crimping operation, clamping means operatively connected to said support means and adapted to engage a cotton picker bar at spaced intervals to secure said bar to said support means and said plurality of plugs, a frame member connected to opposite ends of said support means for rotative movement relative thereto, and a crimping tool assembly connected to said frame member adjacent said plurality of plugs and being movable longitudinally thereof whereby said crimping tool assembly is movable longitudinally of the length of a cotton picker bar secured on said support means and radially thereof for crimping the lands of the bar.

5. A tool assembly as set forth in claim 4 in which said clamping means are pivotally connected to said support means and are positioned to engage the side of the cotton picker bar opposite the spindle apertures at substantially opposite ends of the bar.

6. A tool assembly as set forth in claim 4 in which said plurality of plugs are contoured to the spindle apertures of a cotton picker bar.

7. A tool assembly for recirmping worn lands as set forth in claim 4, in which said plurality of plugs are longitudinally aligned and individually disposed in angular relation with said support means to thereby slidably engage the spindle apertures of a cotton picker bar.

8. A tool assembly for recrimping worn lands as set forth in claim 4 and a mandrel adapted for insertion within and engagement with the full length of a cotton picker bar for cooperation with said plurality of plugs, clamping means and said crimping tool assembly to prevent bowing of said bar.

References Cited by the Examiner
UNITED STATES PATENTS

| | | | |
|---|---|---|---|
| 2,205,784 | 6/40 | Arutunoff | 153—52 |
| 2,510,024 | 5/50 | Mayer | 153—76 |
| 2,711,205 | 6/55 | Brown | 153—52 |
| 2,936,660 | 5/60 | Snow | 78—14 |
| 3,041,907 | 7/62 | Gallagher | 83—564 |

CHARLES W. LANHAM, *Primary Examiner.*